(12) United States Patent
Seo

(10) Patent No.: US 6,317,168 B1
(45) Date of Patent: Nov. 13, 2001

(54) DIGITAL TV RECEIVER FOR PERFORMING CHANNEL SELECTION USING STORED CHANNEL INFORMATION AND METHOD PERFORMING THE SAME

(75) Inventor: Young-Joo Seo, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/222,723

(22) Filed: Dec. 29, 1998

(30) Foreign Application Priority Data

Mar. 31, 1998 (KR) .................................................. 98-11307

(51) Int. Cl.$^7$ ............................... H04N 3/27; H04N 5/44; H04N 5/46; H04N 5/50
(52) U.S. Cl. .......................... 348/725; 348/731; 348/732; 348/554; 348/555; 348/556; 455/191.1; 455/191.3
(58) Field of Search ..................................... 348/725, 731, 348/732, 733, 554, 555, 556; 455/180.1, 188.1, 191.1, 191.3; H04N 3/27, 5/46, 5/44, 5/50

(56) References Cited

U.S. PATENT DOCUMENTS

| | | | |
|---|---|---|---|
| 5,532,748 | * 7/1996 | Naimpally | 348/554 |
| 5,898,463 | * 4/1999 | Nishiyama | 348/554 |
| 5,900,915 | * 5/1999 | Morrison | 348/555 |
| 5,969,767 | * 10/1999 | Ishiwaka et al. | 348/564 |
| 5,982,411 | * 11/1999 | Eyer et al. | 348/734 |
| 6,014,178 | * 1/2000 | Jeon et al. | 348/554 |
| 6,128,352 | * 10/2000 | Maeda | 348/732 |
| 6,137,537 | * 10/2000 | Tsuji et al. | 348/554 |
| 6,208,388 | * 3/2001 | Farleigh | 348/555 |

* cited by examiner

*Primary Examiner*—Reinhard J. Eisenzopf
*Assistant Examiner*—Brian P. Yenke
(74) *Attorney, Agent, or Firm*—Sughrue, Mion, Zinn, Macpeak & Seas, PLLC

(57) ABSTRACT

Disclosed is a digital TV receiver performing a channel selection using stored channel information and a method for selecting a channel. With respect to a broadcasting signal which is not being currently viewed, the receiver activated at a predetermined period of time to receive that broadcasting signal. The receiver receives and stores channel information for that signal. A channel selection is performed by displaying the stored channel information or an effective channel according to the stored channel information, at the time of switching of a reception mode. Since the channel selection is performed using the stored channel information, the invention can save a time for selecting a channel and provide convenience of use.

4 Claims, 2 Drawing Sheets

DIGITAL TV RECEIVER FOR PERFORMING CHANNEL SELECTION USING STORED CHANNEL INFORMATION AND METHOD PERFORMING THE SAME

BACKGROUND OF THE INVENTION

1. Field of the Invention

The present invention relates to a digital TV receiver capable of receiving an analog broadcasting signal and a digital broadcasting signal. More particularly, the invention relates to a digital TV receiver which stores channel information with respect to a broadcasting signal which is not currently being viewed, and uses the stored channel information to select a broadcasting channel when a broadcasting signal reception mode is changed, and a method performing the same.

2. Description of the Related Art

A general digital TV receiver having at least two reception modes is capable of receiving an analog broadcasting signal and a digital broadcasting signal. It does not store channel information for a digital broadcasting signal which is currently not being viewed a reception mode where an analog broadcasting signal is selected and viewed, and vice versa. Thus, when a user viewing a program in a certain mode, alters the reception mode in order to view a program of another broadcasting signal, it takes much time to select a channel according to a channel-up/channel-down operation.

SUMMARY OF THE INVENTION

To solve the above problems, it is an object of the present invention to provide a digital TV receiver which stores channel information with respect to a broadcasting signal which is not being currently viewed and immediately performs a channel selection using the stored channel information when a broadcasting signal reception mode is altered, and a method therefor.

To accomplish the above object of the present invention, there is provided a digital TV receiver capable of receiving a digital broadcasting signal and an analog broadcasting signal, the digital TV receiver comprising:

a first input portion for receiving a digital broadcasting signal when a current mode is a digital broadcasting signal reception mode, and receiving the digital broadcasting signal at a predetermined period of time when the current mode is not the digital broadcasting signal reception mode; second input portion for receiving an analog broadcasting signal when the current mode is the analog broadcasting signal reception mode, and receiving the analog broadcasting signal at the predetermined period of time when the current mode is not the analog broadcasting signal reception mode; a switching portion for receiving and outputting a first broadcasting signal from one input portion corresponding to the current mode where one of the digital broadcasting signal and the analog broadcasting signal is received, and receiving and outputting, at the predetermined period of time, a second broadcasting signal from another input portion which is not the broadcasting signal corresponding the current mode; a first signal processor for signal-processing the digital broadcasting signal received from the switching portion to output first channel information; a second signal processor for signal-processing the analog broadcasting signal received from the switching portion to output second channel information; and a controller for receiving and storing channel information for a broadcasting signal which is not received from one of the first signal processor and the second signal processor, at a predetermined period of time, and performing a channel selection based on the stored channel information, when the current mode is switched.

There is also provided a method for performing a channel selection using channel information in a digital TV receiver capable of receiving a digital broadcasting signal and an analog broadcasting signal, the channel selection method comprising the steps of:

(a) discriminating a reception mode with respect to a broadcasting signal which is currently being viewed;

(b) receiving and storing at a predetermined period of time channel information on a broadcasting signal which is not being currently viewed, in response to a discrimination result of the step (a); and (c) performing a channel selection using the channel information stored for a broadcasting signal which is not currently being viewed at the time of switching of a reception mode from the broadcasting signal reception mode which is being currently viewed.

BRIEF DESCRIPTION OF THE DRAWINGS

The above object and other advantages of the present invention will become more apparent by describing the preferred embodiment thereof in more detail with reference to the accompanying drawing in which.

DETAILED DESCRIPTION OF THE PREFERRED EMBODIMENT

Figure 1:
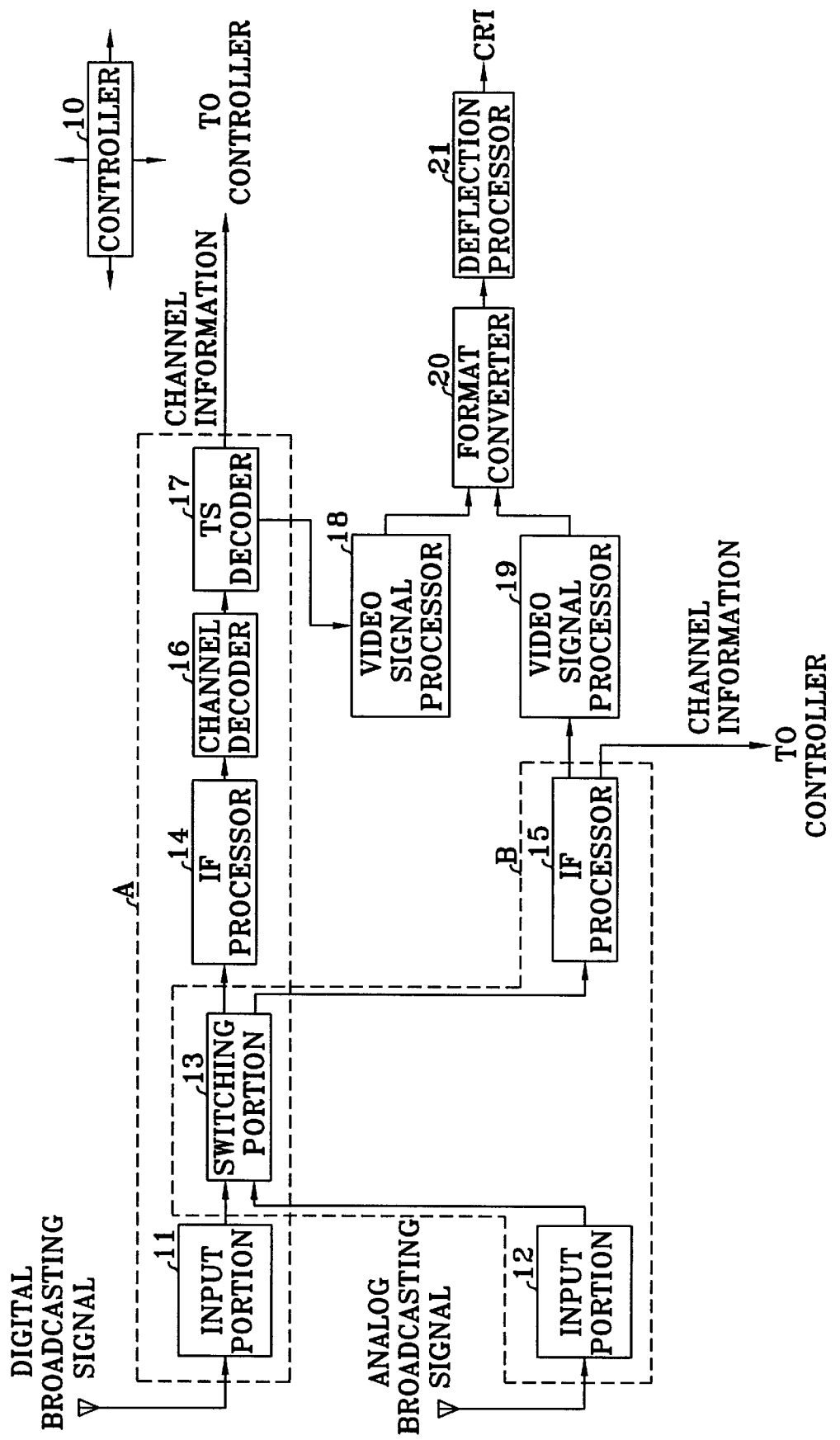
FIG. 1 is a block diagram showing a configuration of a digital TV receiver according to the present invention.

Referring to FIG. 1, a digital TV receiver includes a controller 10 which controls the entire operations of the digital TV receiver, stores channel information with respect to broadcasting signals which are not currently viewed by activating a receiving portion ("A" or "B" shown in FIG. 1) of a broadcasting signal which is not currently viewed, at a predetermined period of time. The controller also performs a channel selection according to the stored channel information when a reception mode switching signal is input to alter a broadcasting signal reception mode which is being currently viewed. The digital TV receiver also includes input portions 11 and 12 for receiving a digital broadcasting signal and an analog broadcasting signal via each antenna, respectively. output ends of the input portions 11 and 12 are connected to a switching portion 13, which receives and outputs an output signal of an input portion corresponding to a broadcasting signal intended to be viewed, and simultaneously, receives and outputs at a predetermined period of time an output signal of an input portion corresponding to a broadcasting signal which is not currently viewed. Portion "A" includes an intermediate frequency (IF) processor 14 for amplifying an IF signal obtained from a digital broadcasting signal and outputting the amplified result and a channel decoder 16 for error-detecting and error-correcting an input signal and outputting an error corrected signal. Following in succession area transport stream (TS) decoder 17 for separating a video signal from an input signal, outputting the video signal, and outputting channel information to the controller 10, and a video signal processor 18 for signal-processing the separated video signal and outputting the signal processed result. The IF processor, channel decoder, TS decoder and video signal processor are connected, in sequence, to the output end of the switching portion 13. Also connected in sequence to the output end of the switching portion 13 are an IF processor 15 for amplifying the IF signal obtained from the analog broadcasting signal and outputting the amplified result, and outputting the channel information to the controller 10 and a video signal processor 19 for adjusting levels such as color, brightness and tone with respect to the input signal, analog-to-digital. (A/D) converting the adjusted result and outputting the A/D converted result. A format converter 20 for format-converting an input video signal into a preset display type is connected in common to the output ends of the video signal processors 18 and 19. An output end of the format converter 20 is connected to a deflection processor 21, which separates horizontal and vertical sync signals from the input video signal, outputs the separated horizontal and vertical sync signals to a cathode ray tube (CRT), and generates a sawtooth wave current flowing through a deflection coil of the CRT and outputs the generated sawtooth wave current to the CRT.

The operation of the digital TV receiver having the above configuration will be described in more detail with reference to FIG. 2.

Figure 2:
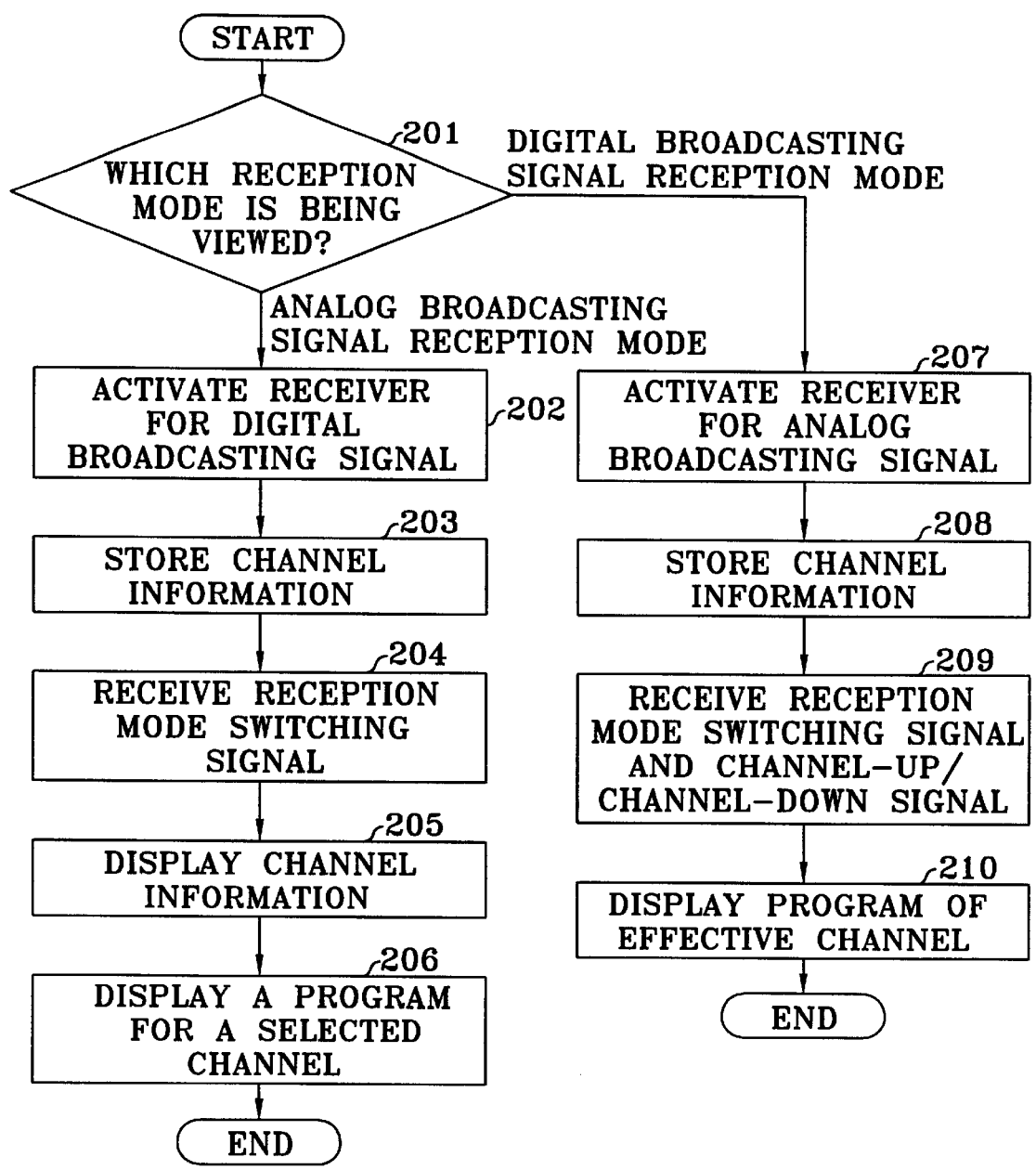
FIG. 2 is a flowchart view for explaining the operation of a digital TV receiver according to the present invention.

FIG. 2 is a flowchart view for explaining the operation of a digital TV receiver according to the present invention.

First, the controller 10 discriminates a broadcasting signal reception mode with respect to a channel which is being currently viewed by a user (step 201). As a result of a discrimination of the step 201, when a broadcasting signal reception mode of a channel which is being currently viewed is an analog broadcasting signal reception mode, the controller 10 activates a receiving portion "A" at a predetermined period of time in order to receive a digital broadcasting signal (step 202). At this time, the switching portion 13 outputs the input signal supplied from the input portion 12 to the IF processor 15, and simultaneously outputs the input signal supplied from the input portion 11 to the IF processor 14. The controller 10 receives, from the TS decoder 17, electronic program guide (EPG) data of a digital broadcasting signal output, that is, channel information such as a broadcasting time, a program title and a channel number contained in the received digital broadcasting signal, and stores the received channel information in an internal memory (not shown) (step 203).

After performing the step 203, when a user alters a broadcasting signal reception mode via a key input portion (not shown), that is, when a current reception mode is switched from an analog broadcasting signal reception mode which is being currently viewed to a digital broadcasting signal reception mode, the controller 10 receives a switching signal of the reception mode (step 204). The controller 10 processes channel information in such a manner that the channel information for the digital broadcasting signal stored in the memory can be displayed on the CRT (step 205). Here, the controller 10 stops the operations of the receiving portion "B" for a analog broadcasting signal reception mode and the video signal processor 19, so that a program of a channel of the analog broadcasting signal which is being viewed is not displayed. When the user selects a channel for a program desired to be viewed from the displayed channel information, the controller 10 controls a receiving portion "A" for a digital broadcasting signal reception mode and the video signal processor 18, so that a program of the selected channel can be displayed on the CRT (step 206). As described above, the stored channel information is displayed on the CRT at the time of switching the reception mode, and a user can select a channel immediately using the displayed channel information. Thus, the time necessitated for the channel selection can be reduced.

If the result of the discrimination of the step 201 is different from the described above and the broadcasting signal reception mode of a channel which is being currently viewed is a digital broadcasting signal reception mode, the controller 10 activates the receiving portion "B" at a predetermined period of time in order to receive an analog broadcasting signal in FIG. 1 (step 207). At this time, the switching portion 13 outputs the input signal supplied from the input portion 11 to the IF processor 14, and simultaneously outputs the input signal supplied from the input portion 12 to the IF processor 15. The controller 10 receives effective channel data with respect to an analog broadcasting signal received from the IF processor 15, that is, channel information of the effective channel data in which broadcasting signals exist via an auto fine tuning (AFT) of a received analog broadcasting signal, and stores the received channel information in an internal memory (step 208).

After performing the step 208, if the user changes a broadcasting signal reception mode through a key input portion (not shown) and performs a channel-up/channel-down operation after performing the step 208, the controller 10 receives a switching signal for the reception mode and a channel-up/channel-down signal (step 209). The controller 10 uses the channel information stored in the memory, so that only programs corresponding to the effective channels can be displayed according to the input channel-up/channel-down signal (step 210). As described above, since the program of the effective channel is displayed using the channel information for the stored effective channel with respect to the user's channel-up/channel-down operation at the time of switching of the reception mode, the user can select a channel to be viewed immediately.

While only a certain embodiment of the invention has been specifically described herein, it will apparent that numerous modifications may be made thereto without departing from the spirit and scope of the invention.

What is claimed is:

1. A digital TV receiver capable of receiving a digital broadcasting signal and an analog broadcasting signal, the digital TV receiver comprising:

a first input portion for receiving a digital broadcasting signal when a current mode is a digital broadcasting signal reception mode, and receiving the digital broadcasting signal at a predetermined period of time when the current mode is not the digital broadcasting signal reception mode;

a second input portion for receiving an analog broadcasting signal when the current mode is an analog broadcasting signal reception mode, and receiving the analog broadcasting signal at the predetermined period of time when the current mode is not the analog broadcasting signal reception mode;

a switching portion for receiving and outputting a first broadcasting signal from one input portion corresponding to the current mode where one of the digital broadcasting signal and the analog broadcasting signal is received, and receiving and outputting, at the predetermined period of time, a second broadcasting signal from another input portion which is not the broadcasting signal corresponding to the current mode;

a first signal processor for signal-processing the digital broadcasting signal received from the switching portion to output first channel information;

a second signal processor for signal-processing the analog broadcasting signal received from the switching portion to output second channel information; and a controller for receiving and storing channel information for a broadcasting signal which is not received from one of the first signal processor and the second signal processor, at a predetermined period of time, and performing a channel selection, based on the stored channel information, when the current mode is switched.

2. The digital TV receiver according to claim 1, wherein said channel information is data for an electronic program guide in case of the digital broadcasting signal, and data for an effective channel in case of an analog broadcasting signal.

3. The digital TV receiver according to claim 1, wherein said controller signal-processes the channel information stored in the digital broadcasting signal and displays the signal-processed result to thereby perform a channel selection, when the current mode is switched to the digital broadcasting signal reception mode, and displays only a program with respect to an effective channel according to the channel-up/channel-down signal using the channel information stored in the analog broadcasting signal when the current mode is switched to the analog broadcasting signal reception mode and the channel-up/channel-down signal are applied, to thereby perform a channel selection.

4. The digital TV receiver according to claim 1, wherein:

said first input portion outputs the digital broadcasting signal at said predetermined period of time, simultaneous with said second input portion outputting the analog broadcasting signal, when the current mode is the analog broadcasting signal reception mode; and said second input portion outputs the analog broadcasting signal at said predetermined period of time, simultaneous with said first input portion outputting the digital broadcasting signal, when the current mode is the digital broadcasting signal reception mode.

* * * * *